(12) United States Patent
Pakulski

(10) Patent No.: US 6,331,508 B1
(45) Date of Patent: *Dec. 18, 2001

(54) METHOD FOR CONTROLLING GAS HYDRATES IN FLUID MIXTURES

(75) Inventor: Marek K. Pakulski, The Woodlands, TX (US)

(73) Assignee: BJ Service Company, U.S.A., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/696,447

(22) Filed: Feb. 2, 1998

Related U.S. Application Data

(62) Division of application No. 08/543,014, filed on Oct. 13, 1995, now Pat. No. 5,741,758.

(51) Int. Cl.$^7$ ................. C09K 3/00; C07C 9/00
(52) U.S. Cl. ............... 507/90; 507/246; 585/15; 585/950
(58) Field of Search ............ 507/90, 246; 585/15, 585/950

(56) References Cited

U.S. PATENT DOCUMENTS

| | | |
|---|---|---|
| 3,770,055 | 11/1973 | Larsen . |
| 4,061,580 | 12/1977 | Jahnke . |
| 4,120,358 | 10/1978 | Kalfoglou . |
| 4,129,508 | 12/1978 | Friihauf . |
| 4,384,951 | 5/1983 | McCoy et al. . |
| 4,420,414 | 12/1983 | Valone . |
| 4,424,866 | 1/1984 | McGuire . |
| 4,456,067 | 6/1984 | Pinner, Jr. . |
| 4,547,304 | 10/1985 | McEntire et al. . |
| 4,589,434 | 5/1986 | Kelley . |
| 4,597,779 | 7/1986 | Diaz . |
| 4,602,920 | 7/1986 | Diaz et al. . |
| 4,660,645 | 4/1987 | Newlove et al. . |
| 4,678,558 | 7/1987 | Belluteau et al. . |
| 4,804,485 | 2/1989 | Carroll et al. . |
| 4,883,580 | 11/1989 | Roling et al. . |
| 4,915,176 | 4/1990 | Sugier et al. . |
| 4,973,775 | 11/1990 | Sugier et al. . |
| 5,076,364 | 12/1991 | Hale et al. . |
| 5,154,857 | 10/1992 | Dyrrieu et al. . |
| 5,171,420 | 12/1992 | Forester . |
| 5,260,268 | 11/1993 | Fordberg et al. . |
| 5,351,756 | 10/1994 | Minkkinen et al. . |
| 5,491,269 | 2/1996 | Colle et al. . |
| 6,025,302 | * 2/2000 | Pakulski .................. 507/90 |

FOREIGN PATENT DOCUMENTS

| | | |
|---|---|---|
| WO 93/25798 | 12/1993 | (WO) . |
| WO 94/12761 | 6/1994 | (WO) . |

OTHER PUBLICATIONS

M.A. Peavy and J. L. Cayias: "Hydrate Formation/Inhibition During Deepwater Subsea Completion Operations." *Proc. 1994 SPE Ann. Tech. Conf. and Exhibition*, vol. 1, pp. 143–156. New Orleans, Louisiana, Sep. 25–28, 1994.

M.A. Kelland, et al.: "Control of Hydrate Formation by Surfactants and Polymers." *Proc. 1994 SPE Ann. Tech. Conf. and Exhibition*, vol. 1, pp. 431–438. New Orleans, Louisiana, Sep. 24–28, 1994.

M. H. Yousif: "The Kinetics of Hydrate Formation." *Proc. 1994 SPE Ann. Tech. Conf. and Exhibition*, vol. 1, pp. 169–177. New Orleans, Louisiana, Sep. 25–28, 1994.

M. A. Hight: "State–of–the–Art Survey on Hydrate Formation." *Proc. 1994 SPE. Ann. Tech. Conf. and Exhibition*, vol. 1, pp. 439–448. New Orleans, Louisiana, Sep. 25–28, 1994.

P.K. Notz, et al.: "The Application of Kinetic Inhibitors to Gas Hydrate Problems." *Proc. 27th Ann. OTC*, OTC 7772, pp. 719–730, Houston, Texas, May 1–4, 1995.

B. Bloys, et al.: "Laboratory Testing amd Field Trial of a New Kinetic Hydrate Inhibitor," *Proc. 27th Ann. OTC*, OTC 7772, pp. 691–700. Houston, Texas, May 1–4, 1995.

* cited by examiner

*Primary Examiner*—Philip Tucker
(74) *Attorney, Agent, or Firm*—Browning Bushman P.C.

(57) ABSTRACT

A method for controlling the formation of gas hydrate crystals in a fluid mixture by admixing with said fluid mixture a polyoxyalkylenediamine in an amount effective to prevent and/or inhibit crystal growth.

17 Claims, No Drawings

METHOD FOR CONTROLLING GAS HYDRATES IN FLUID MIXTURES

This application is a division of 08/543,014 filed Oct. 13, 1995, now U.S. Pat. No. 5,741,758.

FIELD OF THE INVENTION

The present invention relates to controlling hydrates, particularly gas hydrates, in fluid mixtures, particularly light hydrocarbons in admixture with water.

BACKGROUND OF THE INVENTION

Clathrate hydrates are crystalline compounds that occur when water forms a cage-like structure around guest molecules, particularly gaseous molecules. Clathrate hydrates, especially in the petroleum industry, are referred to as gas hydrates, gas hydrate crystals, or simply hydrates. In the petroleum industry, gas hydrates pose particular problems with respect to producing, transporting, and processing of natural gas in petroleum fluids. Typical gas hydrates formed in petroleum (hydrocarbon) environments are composed of water and one or more guest molecules such as methane, ethane, propane, isobutane, normal butane, nitrogen, carbon dioxide, and hydrogen sulfate. It is also known that other guest molecules such as ethane, nitrous oxide, acetylene, vinyl chloride, ethyl bromide, oxygen, etc., can also form clathrate hydrates.

It is well established that gas hydrate crystals, when allowed to form and grow, can become a nuisance at best and pose a serious problem at worst. Gas hydrates can block transmission lines and plug blowout preventers, jeopardize the foundations of deep water platforms and pipelines, collapse tubing and casing, and foul process heat exchangers and expanders. To overcome these problems, several thermodynamic measures are possible in principal: removal of free water, maintaining an elevated temperature and/or reduced pressure, or the addition of freezing point depressants (antifreeze). As a practical matter, the last mentioned measure, i.e., adding freezing point depressants, has been most frequently applied. Thus, lower alcohols and glycols, e.g., methanol, have been added to act as antifreezes. However, in order for such substances to be effective, it is necessary that they be added in substantial amounts, e.g., 30% by weight of the water present. Not only is this expensive, it poses an additional problem since the addition of such larger amounts of antifreeze requires that they be recovered prior to further processing of the fluid mixture, e.g., the gas-water mixture.

It has been known for some time that in lieu of antifreezes, one can employ a crystal growth inhibitor that inhibits the formation of the gas-hydrate crystals and/or the agglomeration of the gas hydrate crystallites to large crystalline masses sufficient to cause plugging. Thus, surface active agents such as phosphonates, phosphate esters, phosphonic acids, salts and esters of phosphonic acids, inorganic polyphosphates, salts and esters of inorganic polyphosphates, polyacrylamids, and polyacrylates have been used.

It is also known that poly-N-vinyl-2-pyrrolidone (PVP), which is a well-known water-soluble polymer, is effective, in relatively low concentrations, in interfering with the growth of gas-hydrate crystals. WO94/12761, published Jun. 9, 1994, discloses other additives for inhibiting crystal growth and controlling the formation of gas hydrates in fluid mixtures such as are encountered in the hydrocarbon industry in the production, transportation, and processing of petroleum and natural gas fluids.

SUMMARY OF THE INVENTION

It is therefore an object of the present invention to provide an improved method for controlling the formation and/or growth of gas hydrate crystals in fluid mixtures.

Another object of the present invention is to provide a method for inhibiting the formation and/or growth of gas hydrate crystals in a fluid mixture containing hydrocarbons and susceptible to gas hydrate formation.

Still another object of the present invention is to provide a method for controlling gas hydrate and/or growth formation in hydrocarbon streams such as natural gas streams and other low boiling hydrocarbon fluids.

Still a further object of the present invention is to provide a method for inhibiting gas hydrate and/or growth formation that utilizes relatively small amounts of crystal growth inhibitor, thereby obviating the necessity for recovering such inhibitor.

The above and other objects of the present invention will become apparent from the description given herein and the appended claims.

The present invention provides a method for controlling gas hydrate formation in a fluid mixture containing water and susceptible to the formation of such gas hydrates. In the method according to the present invention, there is added to the fluid mixture an effective amount of a gas hydrate growth inhibitor or additive that can be generally described as a polyoxyalkylenediamine. In particular, the alkoxylated diamines that are useful in the method of the present invention of the general formula:

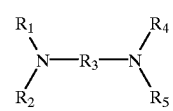

[I]

wherein:
$R_1$ is independently H, —[—$C_nH_{2n}$O—]$_a$—H, or an alkyl group having from 1 to 24 carbon atoms,
$R_2$ is independently H or —[—$C_nH_{2n}$O—]$_b$—H,
$R_3$ is independently —[—$CH_2$—]$_c$—, or —$C_dH_{2d}$—[—O$C_nH_{2n}$—]$_e$—,
$R_4$ is independently H or —[—$C_nH_{2n}$O—]$_f$—H,
$R_5$ is independently H or —[—$C_nH_{2n}$O—]$_g$—H, and
wherein:
a is 1–8,
b+f+g=3–30,
c is 1–6,
d is 1–6,
e is 1–8, and
n is 2 or 3.

DESCRIPTION OF THE PREFERRED EMBODIMENTS

As used herein, the word "controlling," when used in reference to gas hydrate crystals or gas hydrates, is used in the context of inhibiting the formation of gas hydrates as well as preventing growth of gas hydrates that have formed; i.e., the additive prevents hydrate masses from forming a mass or masses that become so large as to impede the flow of the fluid stream. Additionally, while it will be understood that the present invention is useful in any fluid mixture wherein gas hydrates can form, it finds particular utility in the control of gas hydrate formation that could occur during the extraction of natural gas and petroleum fluids, e.g., low boiling hydrocarbons, from a producing well, during transportation of such gas and fluids, and during processing of such gas and fluids. Thus, the invention is particularly applicable to controlling the formation of gas hydrates in fluid mixtures that comprise a gaseous phase and an aqueous phase, the gaseous phase being a low boiling hydrocarbon, as, for example, a hydrocarbon containing from about 1 to 4 carbon atoms such as methane, ethane, propane, butane, etc. The invention thus relates, in one aspect, to a method for inhibiting the formation, growth and/or agglomeration of gas hydrate crystals in a mixture containing low boiling hydrocarbons in water.

In performing the method of the present invention, there is admixed with a fluid mixture, which contains water and at least one guest substance, rendering the fluid mixture susceptible to the formation of gas hydrate crystals, an effective amount of an additive having the general formula:

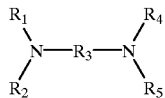

[I]

wherein:

R$_1$ is independently H,—[—C$_n$H$_{2n}$O—]$_a$—H, or an alkyl group having from 1 to 24 carbon atoms, R$_2$ is independently H or —[—C$_n$H$_{2n}$O—]$_b$—H, R$_3$ is independently—[—CH$_2$—]$_e$—, or —C$_d$H$_{2d}$—[—OC$_n$H$_{2n}$—]$_e$—, R$_4$ is independently H or —[—C$_n$H$_{2n}$O—]$_f$—H, R$_5$ is independently H or —[—C$_n$H$_{2n}$O—]$_g$—H, and wherein:

a is 1–8 b+f+g=3–30, c is 1–6, d is 1–6, e is 1–8, and n is 2 or 3.

Preferred are compounds, falling within the above general formula, that have the following formulae:

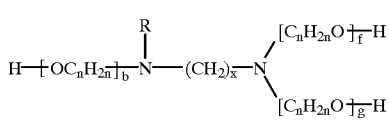

[II]

wherein x=1–4 and R is an alkyl group having from 1 to 20 carbon atoms.

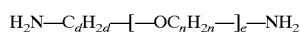

[III]

In a particular preferred embodiment of the present invention, employed are the compounds having the following general formulae:

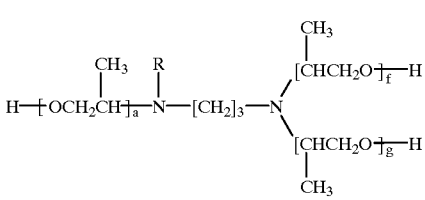

[IV]

wherein R has from 16 to 18 carbon atoms.

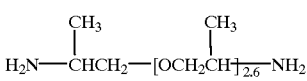

[V]

In the case of compounds having the formula shown in Formula II, it is preferred that the sum of b+f+g be from about 20 to about 30, more especially from about 25 to about 30. Compounds having the structure shown in Formula IV are commercially marketed as Ethoduomeen T/25 by Akzo and are commonly referred to as polyethoxylated N-tallowpropylenediamine. The compound shown in Formula V is commercially marketed by Huntsman Corporation as Jeffamine D-230 and is a polyoxypropylenediamine. A compound having the structure in accordance with Formula III is marketed by Huntsman Corporation as Jeffamine EDR-148 and is a triethylene glycol diamine.

The fluid mixture that can be treated in accordance with the process of the present invention comprises any fluid or fluids comprising water and guest molecules, which water and guest molecules together can form clathrate hydrates. The fluid mixture may comprise any combination of one or more gaseous phase, aqueous liquid phase, and organic liquid phase, and in any and all proportions. Typically, the fluid mixture will comprise at least two fluid phase—a gaseous phase, which comprises guest molecules, and an aqueous liquid phase. Generally, a suitable fluid mixture will comprise an organic liquid phase as well as a gaseous phase and an aqueous liquid phase.

The present invention finds particular utility with fluid mixtures comprising a continuous aqueous liquid phase as opposed to a water-in-oil-type emulsion wherein the aqueous phase is dispersed as small, emulsified droplets throughout a continuous organic phase. Thus, the present invention is particularly useful, for example, when the fluid mixture comprises a gaseous phase and an aqueous liquid phase in the absence of an organic liquid phase, or at least in the absence of an organic liquid phase of significant volumetric proportion relative to the aqueous liquid phase. The present invention will control clathrate hydrates in an aqueous phase, whether such aqueous phase is in a gas/aqueous liquid mixture or in a gas/aqueous liquid/organic liquid mixture. Also, in a gas/aqueous liquid/organic liquid mixture, it is not necessary that the organic liquid phase predominate over the aqueous liquid phase since it is not necessary to disperse the aqueous phase in small droplets in an emulsified form.

The gas hydrate inhibitor or additive of the present invention can be added to the fluid mixture in a variety of ways, the lone requirement being that the additive be sufficiently incorporated into the fluid mixture to control the hydrate formation. For example, admixing of the hydrate inhibitor or additive and the fluid mixture can be affected by mixing the additive into the fluid system, such as into a flowing fluid stream. Thus, the inhibitor could be injected into a downhole location in a producing well to control hydrate formation in fluids being produced through the well. Likewise, the additive could be injected into the produced fluid stream at a wellhead location, or even into piping extending through a riser, through which produced fluids are transported in offshore producing operations from the ocean floor to the offshore producing facility located at or above the surface of the water. Additionally, the additive could be injected into a fluid mixture prior to transporting the fluid mixture, such as by injecting the additive into the fluid mixture, which is then transported, as, for example, via a subsea pipeline from an offshore producing location to an onshore gathering and/or processing facility.

Incorporation or admixing of the hydrate inhibitor or additive into the fluid mixture may be aided by mechanical means such as are well known in the art, as, for example, by using conveniently located static in-line mixers on a pipeline. In most pipeline transportation applications, however, sufficient mixture and contacting will occur due to the turbulent nature of the fluid flow, and mechanical mixing aids are not necessary.

The amount of additive required to be admixed with any particular fluid mixture will depend upon the composition of that system and the conditions of temperature and pressure to which the fluid mixture will be subjected. Thus, knowing such parameters, an effective amount of the hydrate inhibitor or additive can be easily determined and added to a given fluid mixture. Generally, however, the hydrate inhibitor will be admixed with the fluid mixture so as to be present in an amount of from about 0.01 to about 5% by weight, preferably from about 0.05 to about 1% by weight, of the water present in the fluid mixture, more particularly in an amount of from about 0.03 to about 0.75% by weight of the water present in said fluid mixture.

In order to more fully illustrate the present invention, the following non-limiting examples are presented.

EXAMPLE

An accelerated, simulated gas hydrate formation test procedure was used for the testing of the efficiency of the method of the present invention. The test apparatus consisted of a 60-foot long, 1 mm ID stainless steel tubing coil (simulated pipeline) immersed in a temperature controlled bath filled with an ethylene glycol/water mixture. A solution of 20% by weight tetrahyfuran (THF) in admixture with 3.5% by weight sodium chloride in water with and without various additives was circulated by a pump from a reservoir through the coil at a rate of from 0.05 to 0.1 ml/min by means of a pressure gauge and recorder disposed between the pump discharge and the coil. A 15 micron filter in the circulating loop (pump intake) ensured that pressure build-up was not occasioned by plugging from impurities. A provision was made to determine back pressure in the simulated gas pipeline over time. In the table below there is shown the efficiency of various additive compounds in the simulated gas hydrate inhibition test. The times (freeze times) listed in the table (an average of five runs each) reflect the elapsed time at which fluid flow through the simulated pipeline was essentially plugged by gas hydrate formation.

| Test Temp. | No Additive | VC-713[1] 0.5% | VC-713 0.05% | PVP[2] 0.5% | D-230[3] 0.5% | D-230 0.05% | D-400 0.5% | EDR-148[4] 0.5% | Ethoduomeen[5] T/25 0.5% | Ethylene Glycol 0.5% | Hexylene Glycol 0.5% |
|---|---|---|---|---|---|---|---|---|---|---|---|
| −7° C. | 15 hr | >24 hr | >24 hr | >24 hr | >24 hr | >24 hr | | | | 0.25 hr | 5 hr |
| −8° C. | 5 hr | | | | | | | | | | 0.2 hr |
| −9° C. | 0.7 hr | 1.25 hr | 0.58 hr | 1 hr | 6.5 hr | 0.35 hr | >24 hr | >24 hr | >24 hr | | 0.11 hr |
| −10° C. | 0.23 hr | 0.5 hr | | 0.5 hr | 0.22 hr | | | >24 hr | 3.8 hr | | 0.1 hr |
| −12° C. | 5 min | 15 min | | 5 min | 5 min | | 10 min | | 75 min | 10 min | |

[1]Gassix VC-713-terpolymer of vinylcaprolactam/polyvinylpyrrolidone/dimethylaminoethylmethacrylate; marketed by International Specialty Products.
[2]PVP - polyvinylpyrrolidone; marketed by International Specialty Products.
[3]Jeffamine D-230, Jeffamine D-400 - polypropylene glycol diamine; marketed by Huntsman Corporation.
[4]Jeffamine EDR-148 - triethylene glycol diamine; marketed by Huntsman Corporation.
[5]Ethoduomeen T/25 - polyethoxylated N-tallowpropylenediamine; marketed by Akzo Nobel Chemicals, Inc.

As can be seen from the data in the table, the present invention provides a clearly superior method of inhibiting gas hydrate formation as compared with a typical thermodynamic inhibitor such as ethylene glycol, which is commonly used for such purposes. Indeed, it can be seen that a level of 0.5% glycol concentration, this test mixture freezes faster than the test mixture with no additive. Of greater importance is the fact that the method of the present invention works as well as, and in many case better than, prior art kinetic inhibitors such as VC-713 and PVP at the recommended concentration of 0.5% and almost as well at a level of 0.05%, one-tenth of the recommended concentration of the prior art kinetic inhibitors. A distinct advantage of the method of the present invention is that the hydrate inhibitors are amphophilie in nature, thus soluble in both aqueous and organic (hydrocarbon) phases. The inhibitor compounds used in the method of the present invention can be delivered as a solution in alcohol, water, or a mixture thereof. Advantageously, and to prevent further addition of water to the fluid mixture, the product can be injected into the fluid mixture in a hydrocarbon solution.

The foregoing disclosure and description of the invention is illustrative and explanatory thereof, and various changes in the method steps may be made within the scope of the appended claims without departing from the spirit of the invention.

What is claimed is:

1. A method for controlling the formation of gas hydrate crystals in a fluid mixture comprising:

admixing with said fluid mixture an effective amount of at least one additive having the general formula:

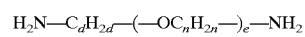

$$H_2N-C_dH_{2d}-(-OC_nH_{2n}-)_e-NH_2$$

and wherein:
d is 1–6,
e is 1–8, and
n is 2 or 3.

2. The method of claim 1, wherein said fluid contains water, and wherein, said additive is present in an amount of from about 0.01 to about 5% by weight of the water present in said fluid mixture.

3. The method of claim 1, wherein said fluid contains water, and wherein said additive is present in an amount of from about 0.03 to about 0.75% by weight of the water present in said fluid mixture.

4. The method of claim 1 wherein said fluid mixture comprises a gaseous phase and an aqueous phase.

5. The method of claim 1 wherein said fluid mixture comprises a gaseous phase, an aqueous phase, and an organic liquid phase.

6. The method of claim 1 wherein said fluid mixture contains a low boiling hydrocarbon.

7. The method of claim 6 wherein said low boiling hydrocarbon contains from 1 to 4 carbon atoms.

8. The method of claim 1 wherein said compound has the formula:

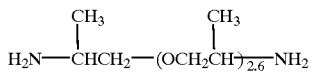

9. The method of claim 1 wherein said compound has the formula:

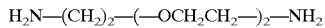

10. A method for controlling the formation of gas hydrate crystals in a fluid mixture comprising:
admixing with said fluid mixture an effective amount of at least one additive having the general formula:

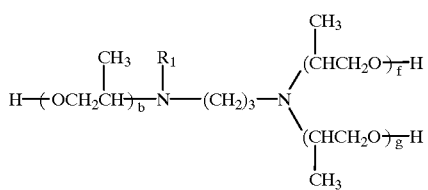

wherein $R_1$ is an alkyl group having from 1 to 24 carbon atoms and $b+f+g=3-30$.

11. The method of claim 10 wherein said fluid mixture contains water.

12. The method of claim 11 wherein said additive is present in an amount of from about 0.01 to about 5% by weight of the water present in said fluid mixture.

13. The method of claim 11 wherein said additive is present in an amount of from about 0.03 to about 0.75% by weight of the water present in said fluid mixture.

14. The method of claim 10 wherein said fluid mixture comprises a gaseous phase and an aqueous phase.

15. The method of claim 10 wherein said fluid mixture comprises a gaseous phase, an aqueous phase, and an organic liquid phase.

16. The method of claim 10 wherein said fluid mixture contains a low boiling hydrocarbon.

17. The method of claim 16 wherein said low boiling hydrocarbon contains from 1 to 4 carbon atoms.

* * * * *